United States Patent [19]
Tognazzini et al.

[11] Patent Number: 5,831,614
[45] Date of Patent: Nov. 3, 1998

[54] X-Y VIEWPORT SCROLL USING LOCATION OF DISPLAY WITH RESPECT TO A POINT

[75] Inventors: Bruce Tognazzini, Woodside; Jakob Nielsen, Atherton; Bob Glass, Los Gatos, all of Calif.

[73] Assignee: Sun Microsystems, Inc., Palo Alto, Calif.

[21] Appl. No.: 673,959

[22] Filed: Jul. 1, 1996

[51] Int. Cl.[6] .................................................. G06F 3/03
[52] U.S. Cl. .......................... 345/341; 345/121; 345/123; 345/156
[58] Field of Search ................................. 345/123, 156, 345/179, 180, 182, 173, 163; 395/341

[56] References Cited

U.S. PATENT DOCUMENTS

| | | | |
|---|---|---|---|
| 5,122,785 | 6/1992 | Cooper | 395/341 X |
| 5,327,162 | 7/1994 | Soma | 345/156 X |
| 5,341,155 | 8/1994 | Elrod et al. | 345/156 X |
| 5,511,148 | 4/1996 | Wellner | 345/156 X |
| 5,526,481 | 6/1996 | Parks et al. | 395/341 |
| 5,528,263 | 6/1996 | Platzker et al. | 345/156 |
| 5,714,972 | 2/1998 | Tanaka et al. | 345/123 X |

*Primary Examiner*—Raymond J. Bayerl
*Assistant Examiner*—Chadwick A. Jackson
*Attorney, Agent, or Firm*—McDermott, Will & Emery

[57] ABSTRACT

A large X-Y workspace, such as a table, serves as a support for a viewport flat panel display which moves over the surface of the table. The portion of the viewport display on the table determines the portion of information displayed on the viewport display. When the surface of the table is used as a backlit display, a low resolution image can be projected onto the surface of the table. The viewport display can then show selected information related to the underlying information it covers, such as high resolution views, infrared views and map information. Lifting a viewport off the table surface freezes the portion of the image on the screen. Images on one viewport can be transferred to another viewport.

11 Claims, 15 Drawing Sheets

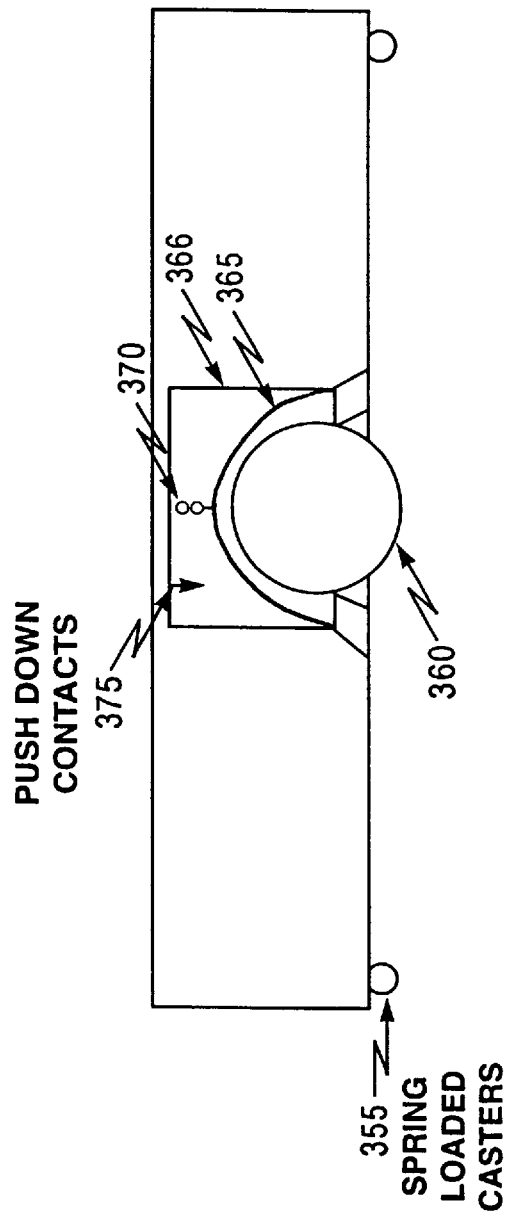

X-Y VIEWPORT SCROLL USING LOCATION OF DISPLAY WITH RESPECT TO A POINT

BACKGROUND OF THE INVENTION

1. Field of the Invention

The invention relates to computer display systems and, more particularly, to systems which use a large X-Y workspace, such as a table, together with a viewport display which moves over the surface of the table in which the position of the viewport display on the table is utilized to determine the portion of information displayed on the viewport display.

2. Description of Related Art

There is a children's toy that displays a scene which may be scrolled and which has a viewer which can be moved in an X and Y direction over the surface of the scene revealing what is "below" or "within" portions of the scene over which the viewer is positioned. The "viewer" is essentially a periscope which although positioned over a scene visible in the upper portion of the toy, actually views corresponding information on a lower scene which is hidden from the user of the toy by an opaque surface. Thus, a child has the illusion of looking inside a building by placing the smaller viewer over a picture of the building.

There is a software technique by which different "lenses" are slid by a user over the surface of a screen, revealing alternative views, similar to the way the children's toy has historically worked.

Scrolling techniques are known in the art. Often, text or graphical information exceeds the size of the window available for viewing it. Under such circumstances, moving the information with respect to the viewing window so that the desired portion of text or graphical material is visible to the user through the window is required. Commonly this is done by manipulating an indicator along a scroll bar in a way which indicates the approximate percentage of displacement in one dimension of the material being viewed. This is a complex activity on the part of the user. It requires locating a pointing device or a scrolling key and operating the device or key to move the contents up or down. This activity takes time and causes a certain level of cognitive disengagement. That is, the user's attention must be distracted from the substantive content of the window to undertake the scrolling activity.

Devices for locating an object with respect to a reference point in fix degrees of freedom are known in the art. One of these, so-called Polhemus devices is available from Polhemus Incorporated of El Cajon.

The Problems

The techniques described above fail to address the problem that user's currently have a choice of either a large display or a high definition display, but not both. The techniques of the prior art do not address the need for higher resolution versions of a low resolution image. The prior art causes significant disruption in a user's thought process when scrolling needs to be undertaken.

SUMMARY OF THE INVENTION

In one form of the invention, a viewport display is positioned on an X-Y surface, such as a table. The position on the table determines what is displayed on the display. That is, a table position is utilized as an access mechanism for specifying the portion of the underlying information to be viewed. Movement of the display on the table acts as a scrolling mechanism to change the display of information.

An extension of this technique utilizes the viewport display on a table on which a low resolution but very large image is projected from beneath the table surface. The display of information shown on the viewport display is related to the projected image displayed on the table so that what one sees on the viewport display encompasses the same location in information space as the portion of the low resolution image covered by the viewport display. Thus, one can see alternative versions of the information in the context of the overall low resolution image.

Viewport displays, of course, can be mounted so as to traverse a vertical surface, such as a wall mounted backlighted projector viewing screen. In addition, a plurality of viewport displays can be utilized in conjunction with the same large image. A viewport display may be equipped to selectively change the secondary view accessed using the viewport display. For example, when a large image is that of a satellite view of some terrain, one might wish to use the viewport display to view a topographical map of the same area. Alternatively, one may wish to see an infrared view of the same area. These can be alternately selected using, for example, a slider switch on the viewport display.

The viewport display is equipped to lift off the surface of the table or low resolution display and, in so doing, freezes the information displayed for more detailed consideration. Further, by pushing down on the viewport display and moving it across the table, a user is able to drag the underlying large image and position it more to a user's liking.

The invention relates to apparatus for displaying information, including a large surface, a substantially flat panel video display for displaying information from a computer, and a location device for locating the display with respect to a point on the table surface and for changing the information as the display moves with respect to the point. A plurality of information sources are each selectable by a switch on the display, for selectively providing information for display. Information displayed on a display device is frozen when the location device indicates that the display has been lifted from the large surface. More than one substantially flat panel video display may be positioned on the surface, each connected to the computer and the computer is configured to transfer information on one of the displays to another.

The large surface can be a back lighted projection screen and the information displayed on the screen can be used to determine the portion of information displayed on the substantially flat panel video display. The information displayed on the screen changes when a user presses down on the display and drags the display over the surface. The projection screen displays an image using a scanning projector and the display detects its own location using a photocell which detects the passing of the projector's scanning.

The invention is also directed to a method for indexing information, by placing a flat panel video display for displaying information from a computer on a flat surface, locating the display with respect to a point on the table surface, and using position of the display on table as index into the information The invention is also directed to a method for indexing information, by placing a flat panel video display for displaying information from a computer on a flat surface, locating the display with respect to a point on the surface, and using an image projected on table as index into another source of related information.

The invention is also directed to a system for displaying information, including, a large surface, a smaller substantially flat panel video display for displaying information from a computer, and a location device for locating the display with respect to a point on the table surface and for changing the information as the display moves with respect to the point.

The invention is also directed to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the present invention will be apparent from the following description in which:

FIGS. 3A and 3B are end and top views, respectively, of a viewport display used in accordance with the invention.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
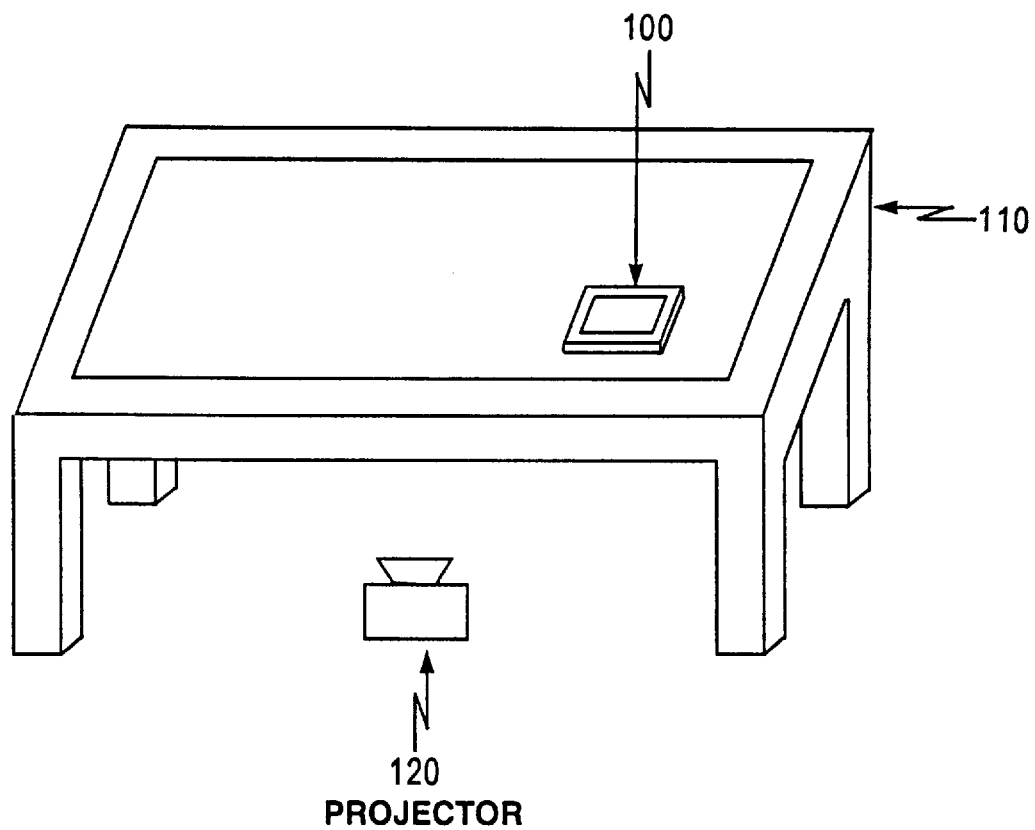
FIG. 1 is a prospective view of an exemplary computer system with a large image projection system and a relatively small viewport display in accordance with the invention.

FIG. 1 is a prospective view of an exemplary computer system with a large image projection system and a relatively small viewport display in accordance with the invention. The viewport display 100 moves across the surface of table 110 and is linked to a computer either by a wire connection or by a wireless connection, such as an infrared link or a radio link. The position of the viewport display 100 on the surface of the table determines what is displayed on the viewport. The position of the viewport display 100 on the surface of the table can be determined utilizing a Polhemus device or other position determining devices.

The projector 120 is optional. If it is utilized, a large but low resolution image is projected from the projector onto the backside of table 110 which is arranged to have a surface which serves as a backlit screen. If a scanning projector is utilized, the position of the viewport display 100 can be determined utilizing photocells positioned on the viewport display.

Figure 2:
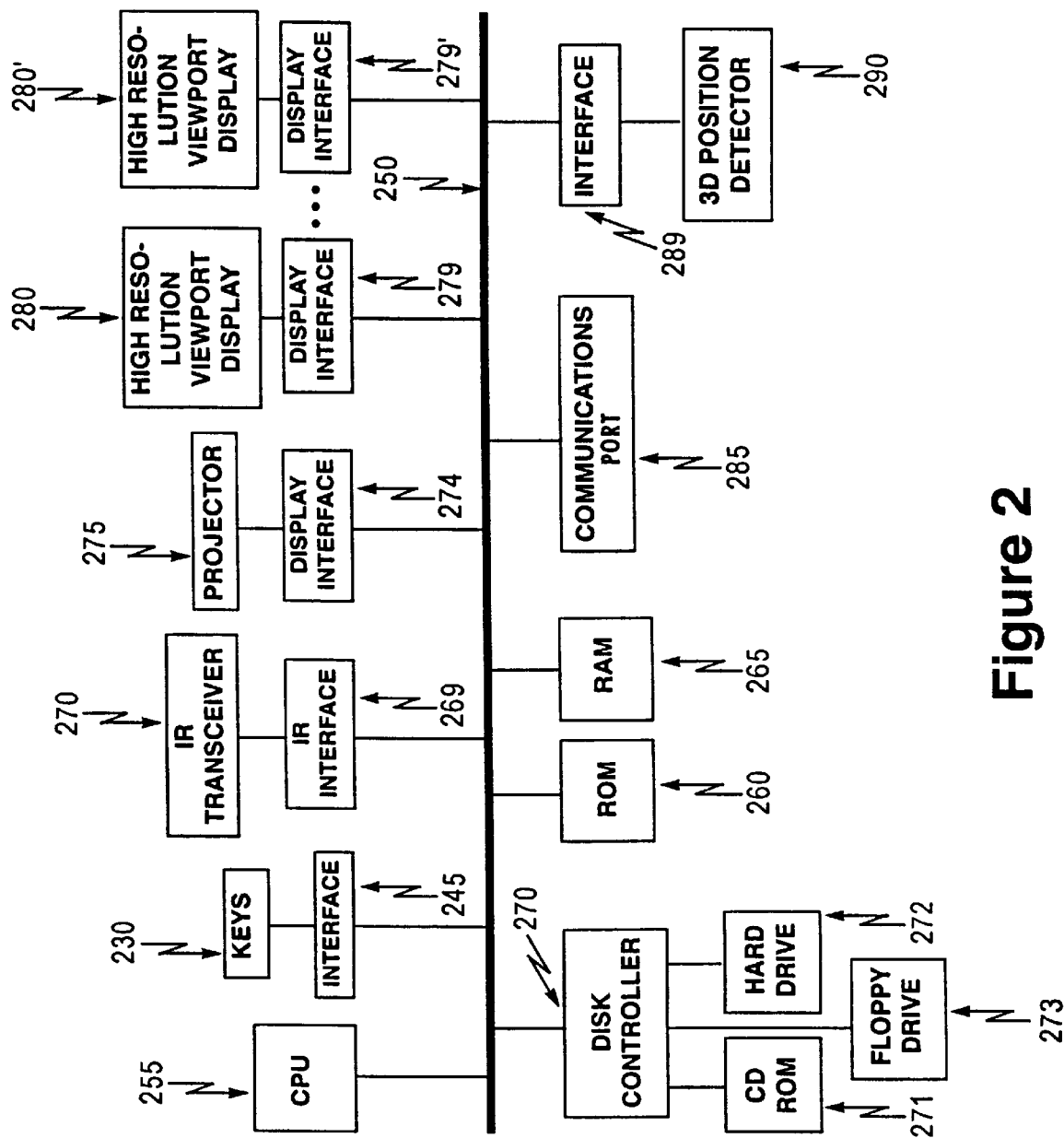
FIG. 2 is a block diagram of a computer system useful in carrying out the invention.

FIG. 2 is a block diagram of a computer system useful in carrying out the invention. A bus 250 serves as a main information highway interconnecting the other components of the computer. CPU 255 is a central processing unit of the system, performing calculations and logic operations required to execute programs. Read only memory (260) and random access memory (265) constitute the main memory of the computer. Disk controller 270 interfaces one or more disk drives to the system bus 250. These disk drives may be floppy disk drives such as 273, internal or external hard drives, such as 272, or CD ROM or DVD (Digital Video Disk) drives such as 271. Communications with external devices can occur over communications port 285. A plurality of function keys may be implemented (230) and connected to the bus over interface 245. One such key would activate a freeze image function on the viewport display. Another key would be utilized to drag the projector image across the table surface. Another key would be one, discussed hereinafter, on the viewport display to drag and position the projected image by pushing down on the viewport display. IR transceiver 270, connected to the bus over interface 269, can be utilized to link wireless versions of the viewport display utilized in accordance with the invention. The projector 275 is connected to the bus 250 over display interface 274 and receives information from the computer for projection onto the backscreen backlit display of the table discussed in conjunction with FIG. 1. A 3D position detector 290 is connected to the bus over interface 289 and is utilized to receive position information to locate the viewport display on the surface of the table. A plurality of high resolution viewport displays 280, 280', are connected over respective display interfaces 279, 279'. Although shown in this figure as hard wired viewport displays, these displays may be linked to the bus over an infrared transceiver such as 270 or over a radio communications link, not shown.

Figure 3B:
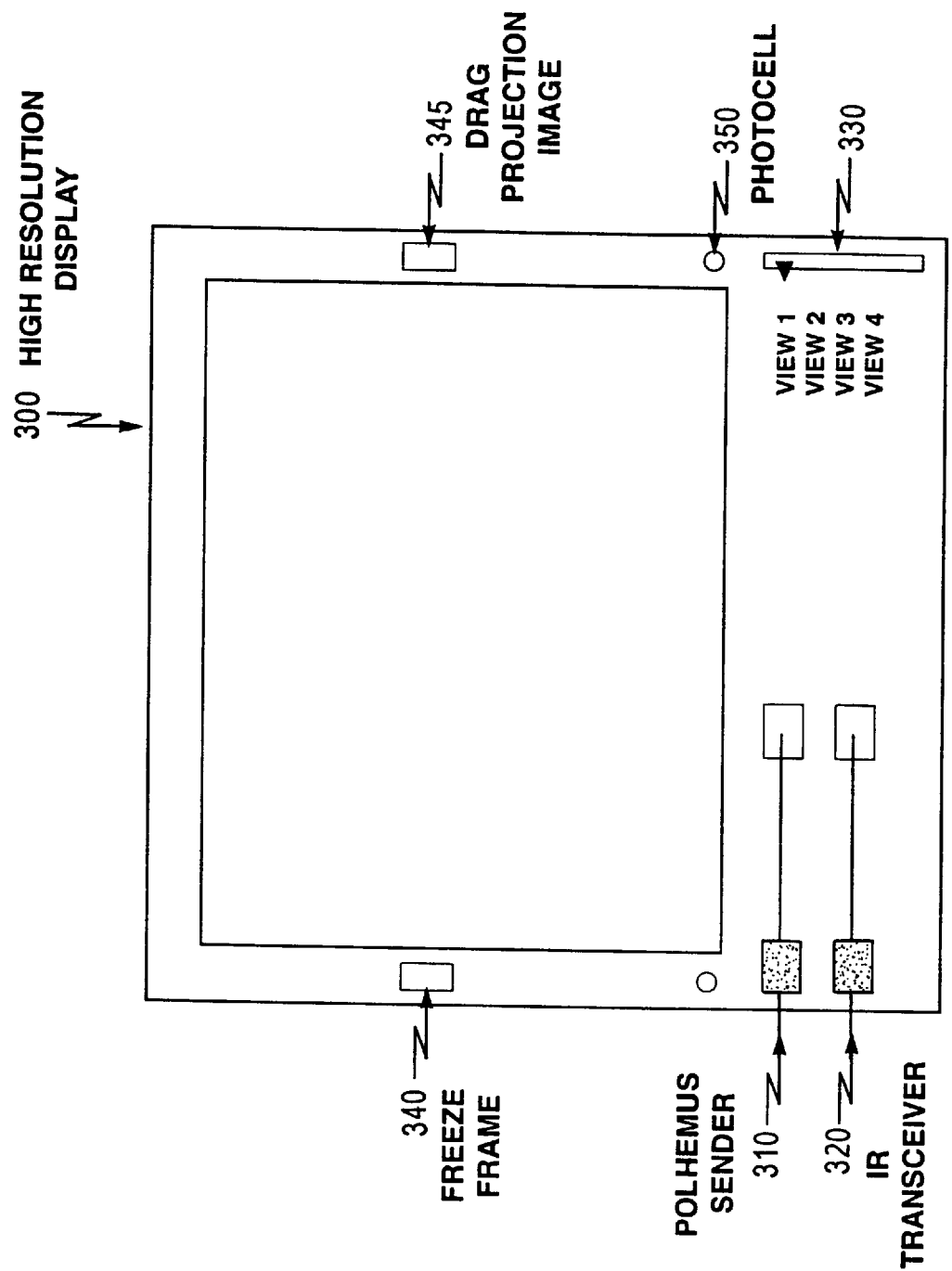

FIGS. 3A and 3B are end and top views of a viewport display used in accordance with the invention, respectively. Turning first to FIG. 3B, high resolution display screen 300 is shown. The viewport display is equipped with a position sensor 310, which in one embodiment is a Polhemus sender. It is also equipped with an infrared transceiver 320 for communicating with the computer controlling the display. A slider switch 330 is utilized to select from one of several views available of the information to be viewed. Button 340 is activated to freeze the image on the screen so that it will not change when moving the physical device. Similarly, switch 345 is utilized to drag the underlying projection image, if one is used, to position it for the convenience of the user. Three photocells 350 are shown which can be utilized in conjunction with a scanning type of projector to determine the address location at which the viewport display is positioned. It operates much like a light pen in terms of sensing address location.

Turning to the side view of FIG. 3A, the viewport display is preferably mounted on spring loaded castors for easy movement across the surface of a table. These, of course, would not be needed if mounted in a vertical orientation. A relative motion detector 360, functioning as a mouse ball can be utilized to track the location of the viewport display either in conjunction with or in lieu of the Polhemus sender 310 shown in FIG. 3B. A spring loaded ball receptacle 365 is mounted within a chamber 366 and biased so that push down contacts 370 normally remain open. However, when downward pressure is placed on the surface of the viewport display in the direction of arrow 375, the spring will yield permitting push down contacts 370 to close and permitting the image projected by the projector to be relocated or dragged in accordance with motion of the viewport display as detected by mouse ball 360. In this manner, the projector image can be controlled when contacts 375 are closed or when button 345 is pushed, and, when they are not pushed, a relative motion of the viewport display will scroll across the image information as a viewport display is moved.

Figure 4:
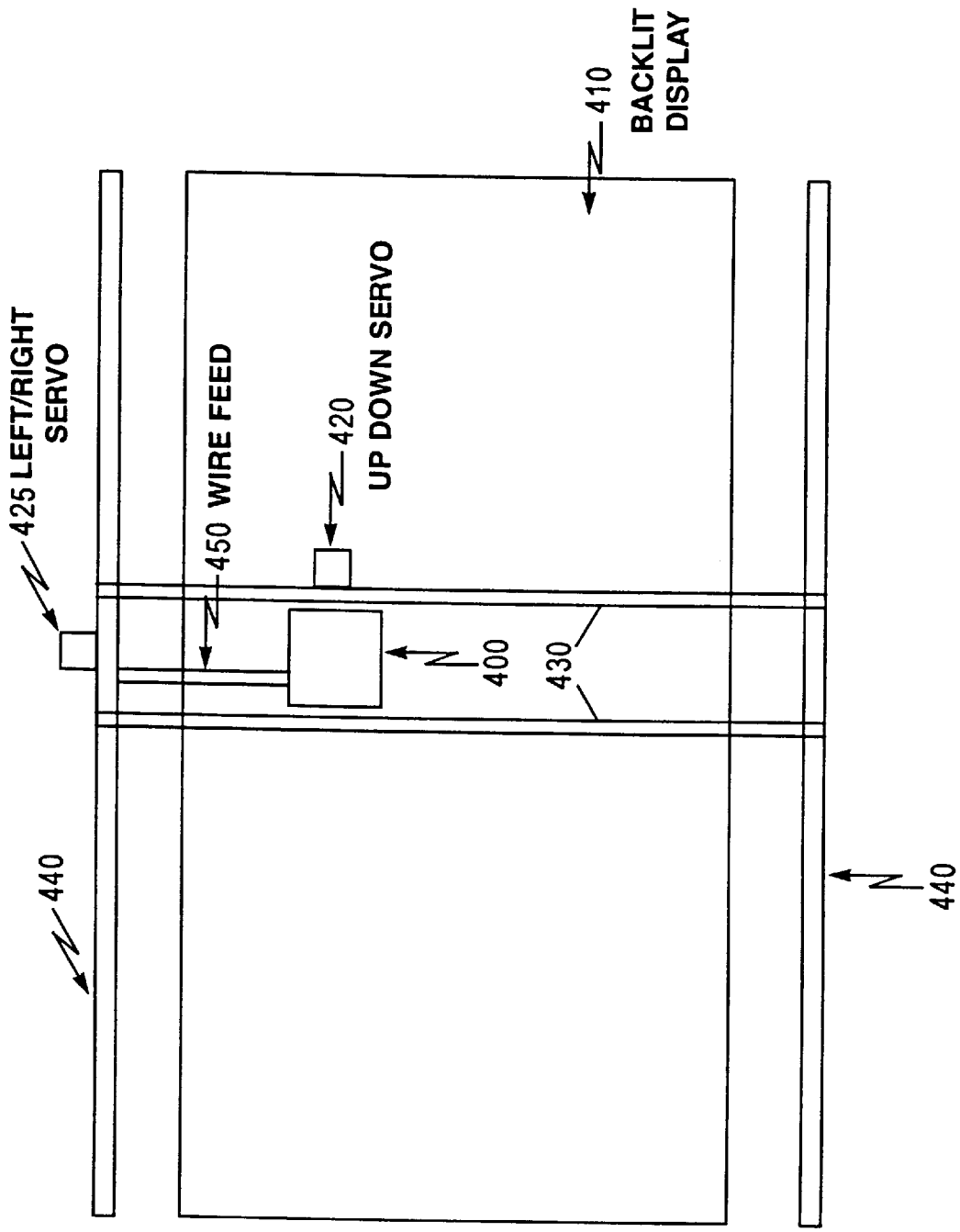
FIG. 4 is a wall mounted version of an exemplary embodiment of the invention.

FIG. 4 is a wall mounted version of an exemplary embodiment of the invention. In this form of the invention, the viewport displays 400 are mounted to form a vertical motion and horizontal motion vis a vis a display projected on a wall. As before, the display on the wall is a backlit display 410 illuminated from a projector behind the wall. The viewport display 400 is mounted within a carriage which rides on tracks 430 controlled by up/down server 420. The tracks 430 are horizontally displaced while using left/right server 425 which controls the movement of the tracks 430 along horizontal tracks 440. In this manner, X-Y positioning of the viewport display 400 may be controlled. Preferably, the weight of the viewport display 400 is counter balanced to minimize the energy consumed during up/down motion of the display. A wire feed 450 contains signal and power for the viewport display. The vertically mounted configuration is useful for large screen displays such as those found in rail yards or in controlling national or regional power grids. In these environments, typically the backlit display 410 shows an overview of the entire system at a very high level. Viewport display 400 can be utilized to obtain additional information about portions of the system over which the viewport display is positioned. The selective view slider switch 330, shown on FIG. 3B, can be utilized to change the underlying view so that a number of different presentations of information about the area covered by the viewport display can be accessed.

Figure 5:
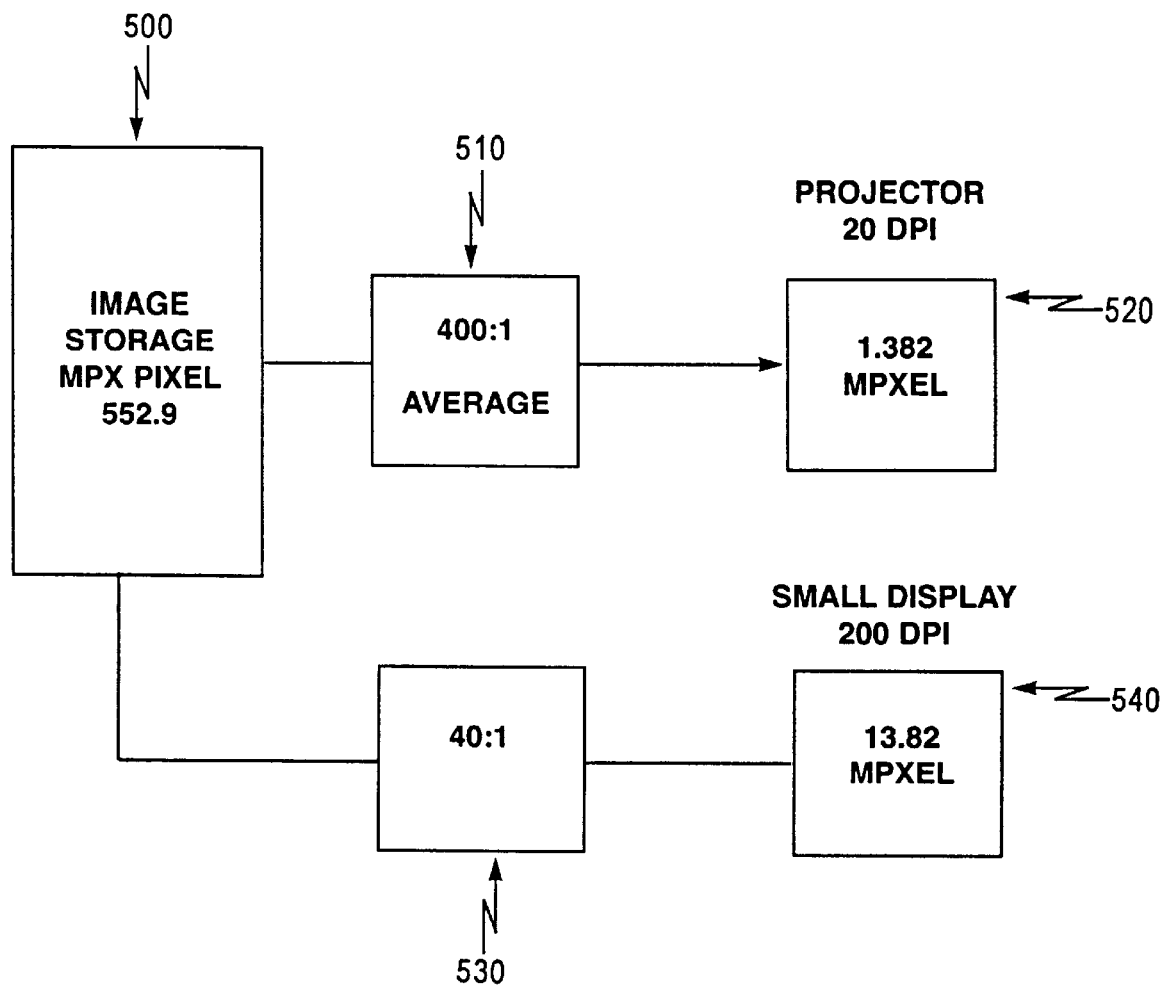
FIG. 5 illustrates a high resolution source of image information converted down to two different resolutions.

FIG. 5 illustrates a high resolution source of image information converted down to two different resolutions. In the example shown in FIG. 5, image storage 500 contains all information needed to store a six foot by four foot image at 400 dpi (dots per inch or pixels per inch). Such image storage would require approximately 552.9 million pixels. By using a 400:1 pixel averaging technique or other resolution conversion techniques, the image represented in image storage 500 can be displayed at 20 dpi spread over the same 6 foot by 4 foot area using only 1.382 million pixels (520). The same image stored in image storage 500 can be converted down at a 40:1 conversion ratio to represent a much higher resolution display for the viewport display. At 200 DPI, the image stored in image storage 500 can be represented with only 13.82 million pixels (540). Thus, the high resolution information stored in image storage 500 can be displayed on a very low resolution device, namely the projector at 20 DPI and the viewport display can display the same image at 200 DPI, thus providing more detail.

Figure 6:
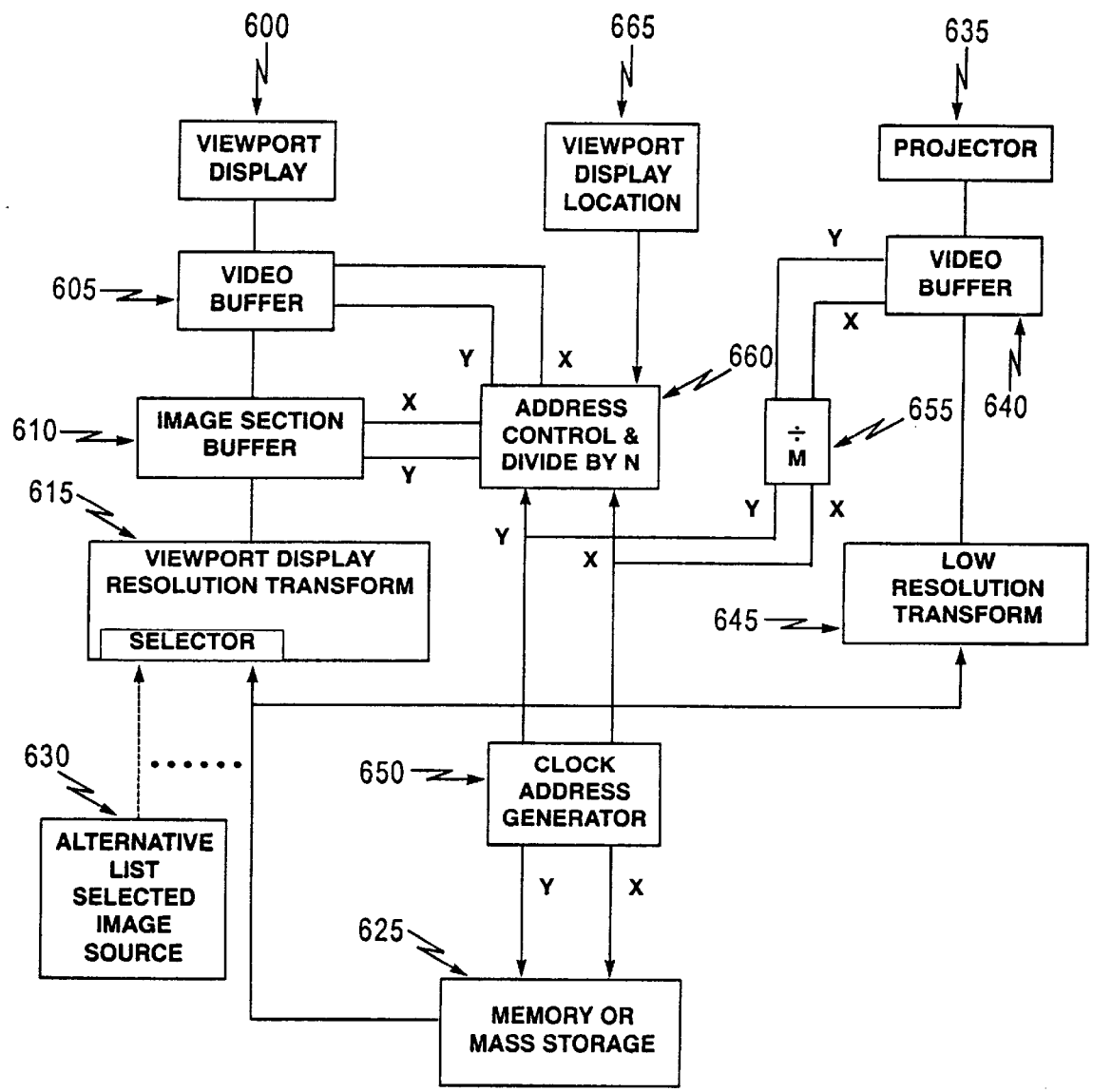
FIG. 6 is a block diagram of projection and viewport display apparatus for selecting sources of image information and for controlling addressing.

FIG. 6 is a block diagram of projection and viewport display apparatus for selecting sources of image information and for controlling addressing.

The image shown on viewport display 600 is derived from video buffer 605 which contains a subset of information stored in image section buffer 610 as described more hereinafter. Memory or mass storage 625 contains image information to be displayed. As discussed in conjunction with FIG. 5, this can be a very high resolution image stored. The high resolution image information is converted in viewport display resolution transform 615 to a resolution appropriate for the viewport display 600. A selector 620 is utilized to select sources of information for display on viewport display 600. An alternative source of related information to that stored in 625 is stored in 630. For example, the image information stored in 625 could be a satellite image of a region and the image information stored in 630 could be a topographical map of the same region. Projector 635 receives the information that it projects from video buffer 640. Projector 635 is a low resolution device and the image displayed is derived from the high resolution version stored in memory 625 using low resolution transform 645. Note that the clock speed is required to deliver all pixels of a high resolution storage such as 625 and those required to deliver a lower resolution version of the same image differ. Thus, if clock address generator 650 is driving the readout, for all devices, it must be divided down in order to control the readout of the lower resolution displays. This division down is illustrated in 655 in FIG. 6. A similar activity occurs in 660 with respect to the viewport display, however, only a portion of the overall information available is needed for video buffer 605. The particular information provided to the image section buffer 610 of the video buffer 605 is based on the location of the viewport display as indicated at 665. The location of the viewport display can be derived from either a Polhemus device, a photocell detection of a scanning location from the projector or by position index as derived from a wall mount display positioning equipment.

Figure 7:
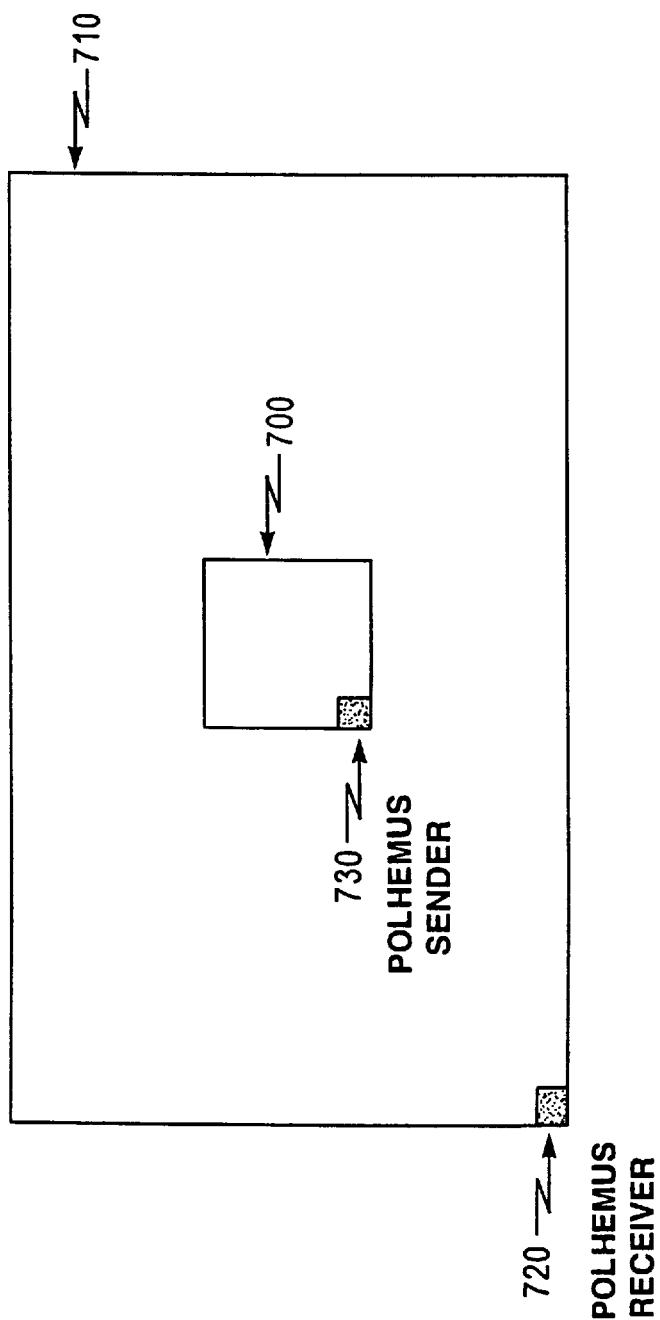
FIG. 7 shows identification of the location of the viewport display vis a vis a large surface using a Polhemus device.

FIG. 7 shows identification of the location of the viewport display vis a vis a large surface using a Polhemus device. As discussed above, a Polhemus device provides information about orientation of a device based on six degree of freedom vis a vis a reference location.

In this case, a Polhemus receiver 720 provides a reference location and a Polhemus sender 730 is attached to the viewport display 700. Thus, the positioning of the viewport display 700 on the table 710 and, more particularly vis a vis the Polhemus receiver 720 can be determined. The Polhemus device can also determine when the viewport display 700 has been lifted off the surface of the table 710 in order to freeze the image on the display at that time.

Figure 8:
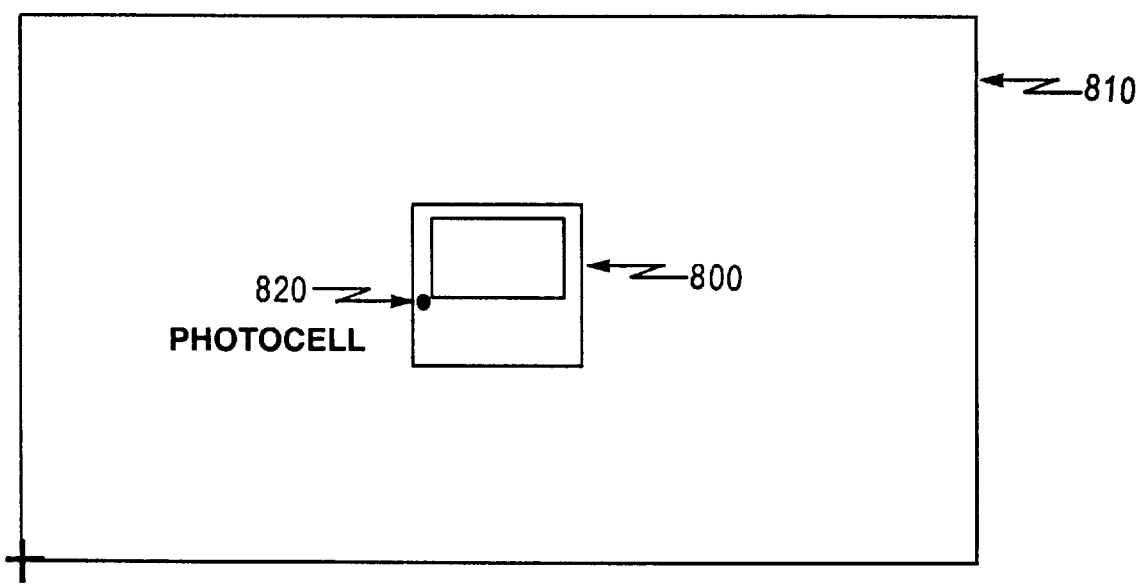
FIG. 8 shows an alternative for locating the viewport display when a scanning projection device is used.

FIG. 8 shows an alternative for locating the viewport display when a scanning projection device is used. A viewport display 800 is positioned over a backlit display 810 which is illuminated by a projector from the rear to show a scanned image. A photocell 820 attached to the bottom of the viewport display 800 detects when a light beam from a scanning projector crosses the photocell. At that instant, the address driving the scanning display is captured to show the position at which the viewport display is located vis a vis the scanning driver. At best, the exact address and location of the information displayed on the underlying backlit display can be determined and utilized to determine the information to be provided on the screen of viewport display 800. Clearly more than one photocell 820 can be utilized to determine the orientation of the device vis a vis the backlit screen 810.

Figure 9:
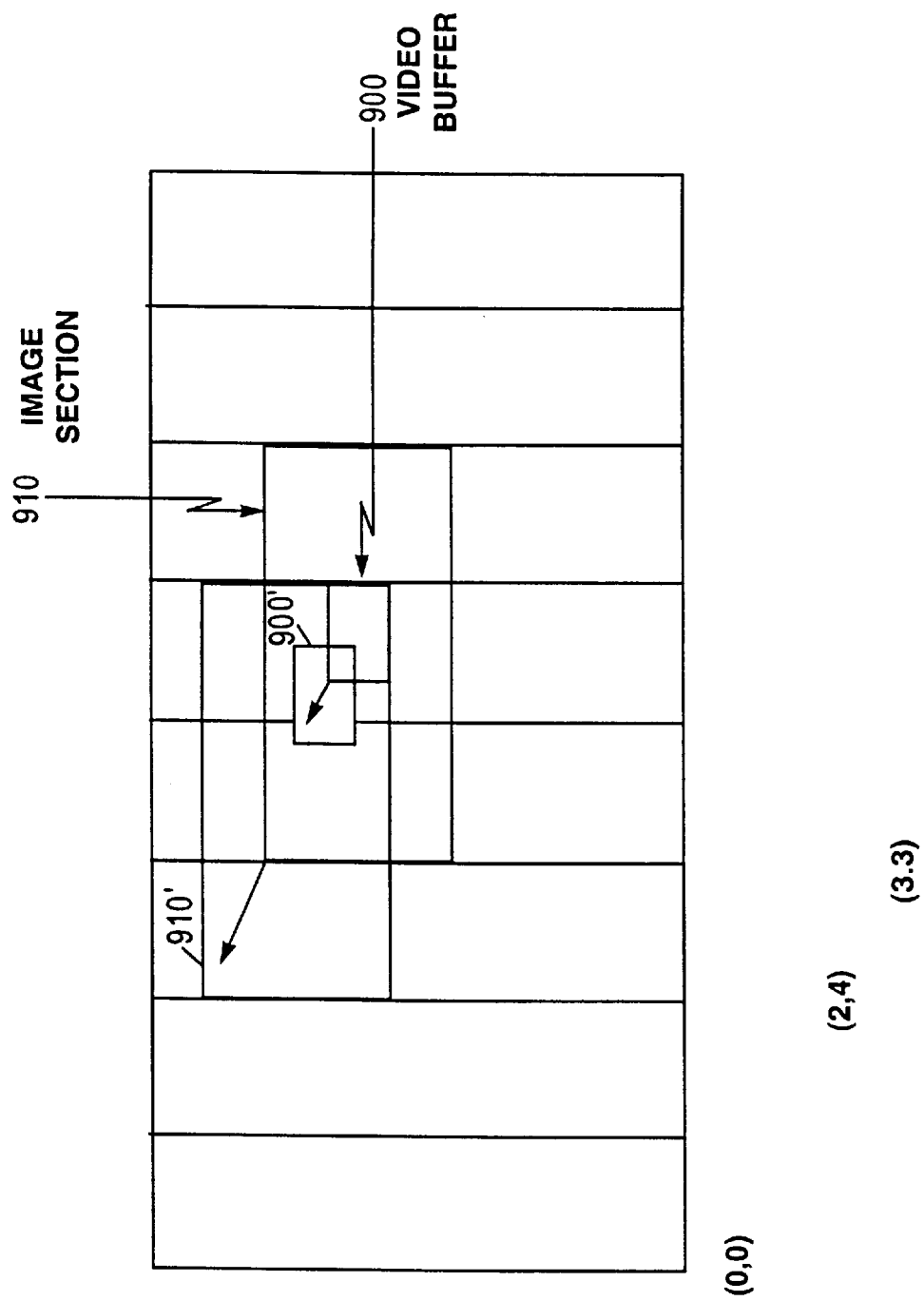
FIG. 9 shows a relationship between image pages and the video buffer, the image section buffer, the image source and the table space.

FIG. 9 shows a relationship between image pages and the video buffer, the image section buffer, the image source and the table space. It is convenient when representing displays at various resolutions to utilize a page oriented addressing scheme in which the resolution of pages changes. For example, a page 900 indicating the contents of video buffer at a particular point in time will encompass the same information in all versions of the display having different resolution. For example, in the projected image, that page of information will contain 20 dots per inch whereas in the viewport display it will contain the same information displayed at a resolution of 200 dots per inch whereas in the underlying storage it will contain the same information at a display of 400 dots per inch. By using a page oriented addressing, the addresses can be made common for both the projection system, the storage system and the video buffer system for the viewport display. As shown in FIG. 9, page 900 is surrounded by image section 910. Image section 910 is a larger section of the underlying image than is shown in the video buffer 900. However, it is useful to have that information cached so that when video buffer moves, information is already available with which to immediately fill the buffer so there is no discontinuity in the display. Thus, for example, when the video buffer, currently located at page 900 shifts to location 900' the pixels to accommodate that relocation are already available, stored in image section 910. At some point, as the video buffer location moves, it is desirable to store different information in image section 910 so that the information will always be available for the video buffer when it is needed.

Figure 10:
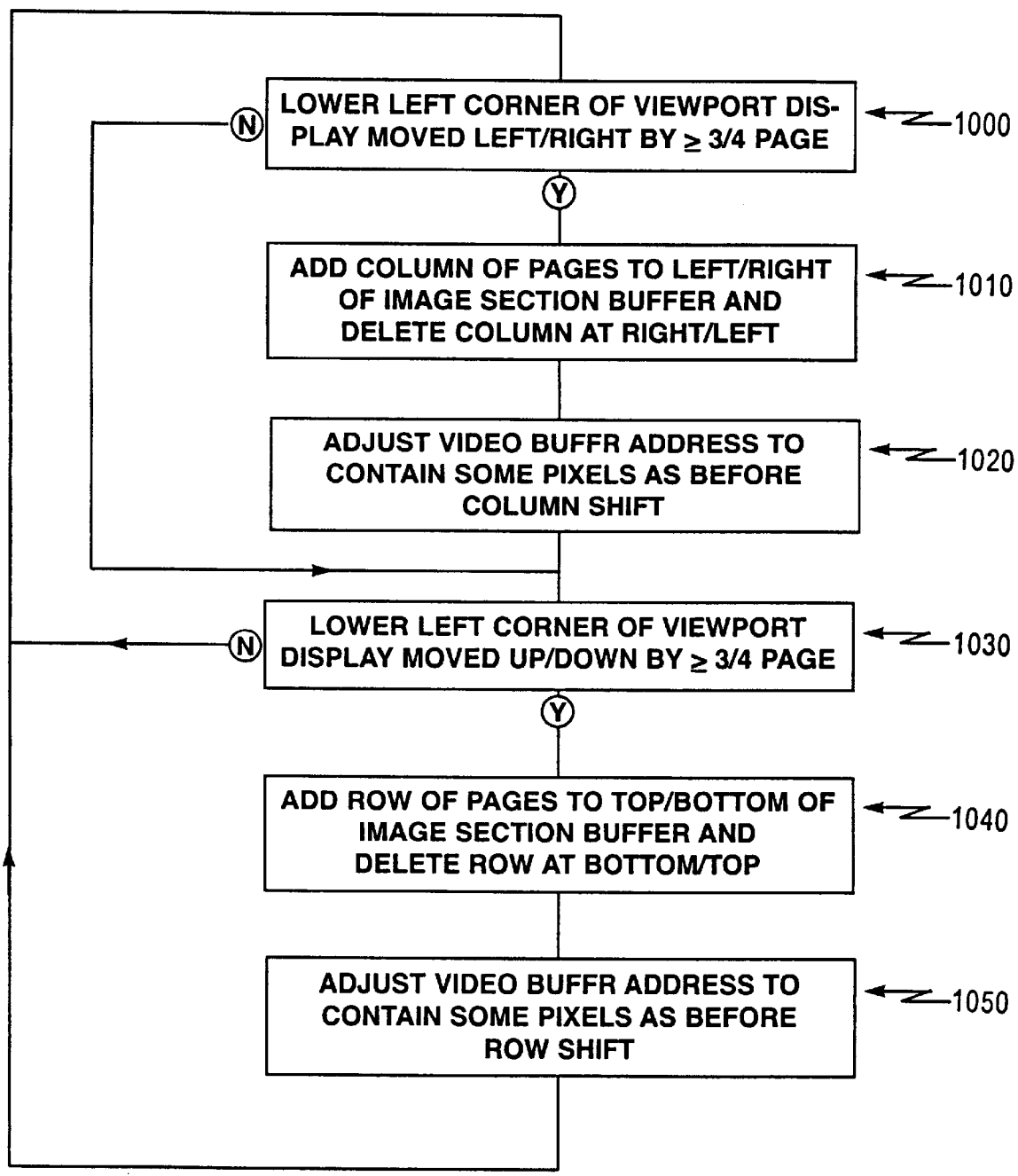
FIG. 10 is a flowchart of a process for moving the viewport display and for changing the image section buffer to ensure that adequate data for the video buffer is available.

FIG. 10 is a flowchart of a process for moving the viewport display and for changing the image section buffer to ensure that adequate data for the video buffer is available. In FIG. 10, the lower left corner is used as a reference point for specifying the location of the viewport display and the location from which image data should be taken for the video buffer for the viewport display. It's lower left corner of the viewport display moves left/right by more than ¾ of a page, (1000) a column of pages is added to the left/right of the image section buffer and a column is deleted at the right/left end of the image buffer (1010). When the contents of the image section buffer changes as described in 1010, it is necessary to adjust the address of the video buffer with respect to the image section buffer so that the video buffer contains the same pixels as before the column shift (1020). Similarly, when the lower left corner of the viewport display is moved up/down by more than ¾ of a page (1030) a row of pages is added to the top/bottom of the image section buffer and a row is deleted at the bottom/top (1040). The same adjustment to the video buffer address is required (1050).

Figure 11:
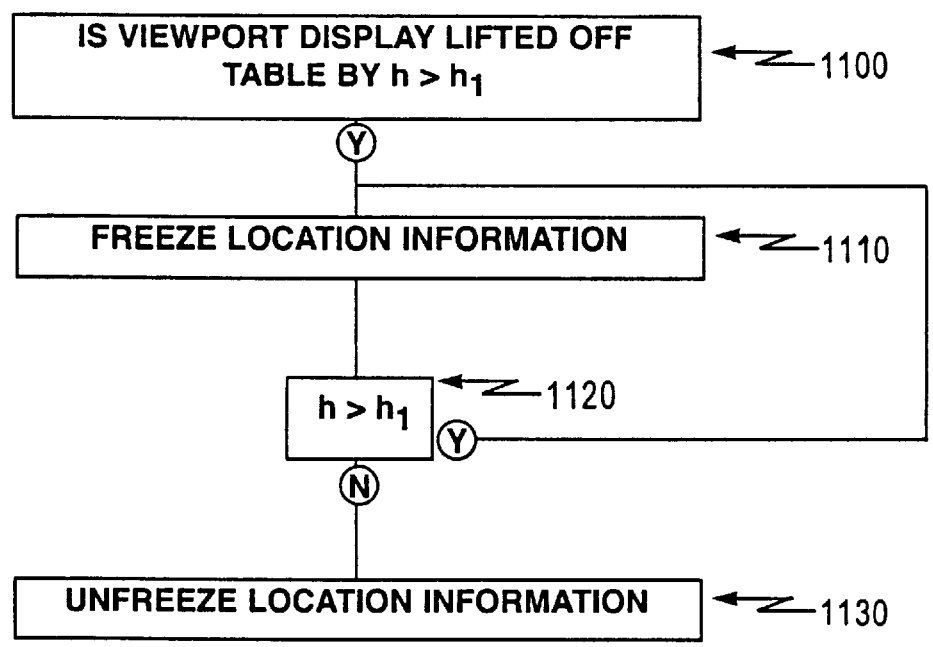
FIG. 11 is a flowchart of an exemplary process for freezing the image on the screen of the viewport display when it is lifted off the table.

FIG. 11 is a flowchart of an exemplary process for freezing the image on the screen of the viewport display when it is lifted off the table. Using the viewport display location device, one determines whether the viewport display has been lifted off the table by an amount H which is greater than a threshold H1 (1100). If it has been, the image displayed on the screen of the viewport display is frozen regardless of its translation with respect to the surface of the table (1110). As long as the viewport display is located off the table by an amount in excess of H1 (1120-Y), the image will remain frozen. However, once it is placed back on the table, the normal location information will be received and the image will achieve the proper content for the location at which it is replaced (1130).

Figure 12:
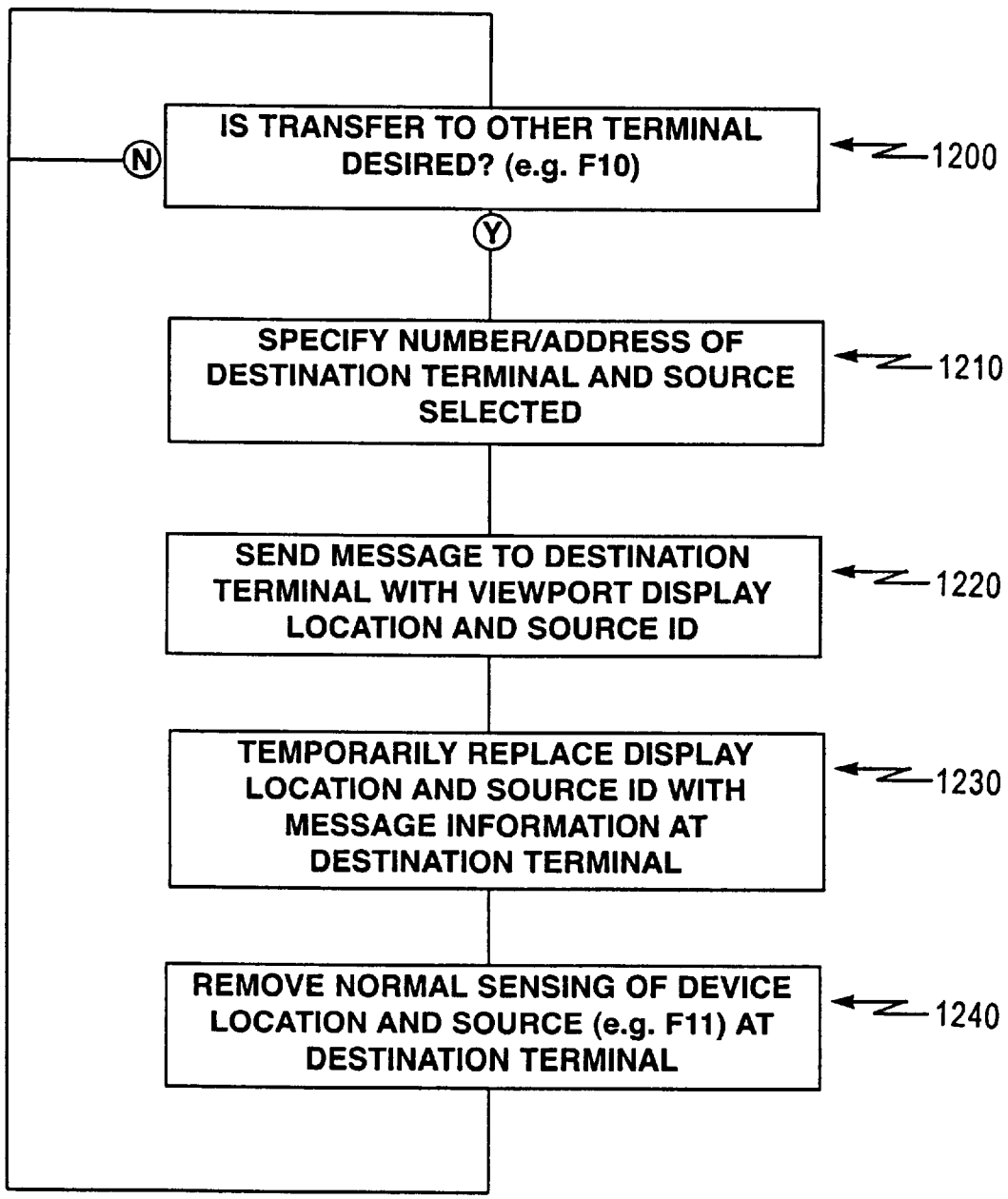
FIG. 12 is a flowchart of a process for transferring an image from one viewport display to another.

FIG. 12 is a flowchart of a process for transferring an image from one viewport display to another. A key is activated to initiate transfer of the contents of the screen at one viewport displayed to that of another (1200). If a keyboard is available on the viewport display, then a typical function key, such as function key F10 might be utilized. If it is not, a specialized key might be utilized. The user will need to specify the destination terminal by either number or address and the source selected (1210) and send that information in a message to the destination terminal (1220). At the receiving terminal, the display location data and source selected identification information received in the message replaces the corresponding data in the viewport display receiving the message (1230). In this manner, the viewport display receiving the message is virtually positioned to see that which is being viewed on another viewport display. When consideration of that information is completed, normal sensing of device location and image source identification is resumed at the destination terminal, such as by pressing a function key (e.g., F11) (1240).

Figure 13:
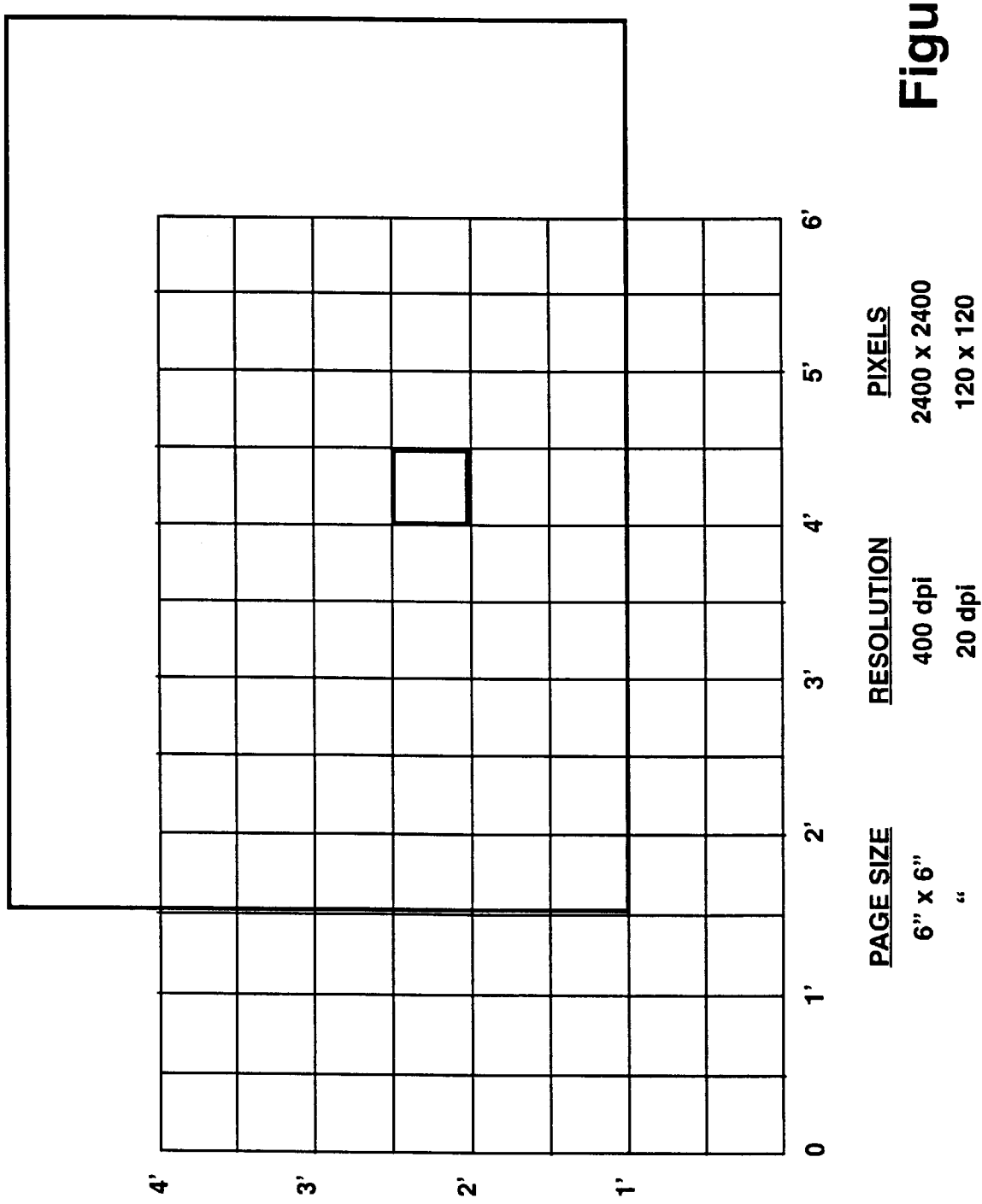
FIG. 13 illustrates movement of a background image coordinate system with respect to a table.

FIG. 13 illustrates movement of a background image coordinate system with respect to a table. When a key such as that utilized at 345 of FIG. 3 is activated or when the viewport display is pressed against the table, activating push down contacts 375, this signals an indication that the projected image should be moved vis a vis the surface of the table. This is illustrated in FIG. 13. In the example shown in FIG. 13, the viewport display is situated with a lower left hand corner at coordinate page 8,4. However, when the coordinate system was positioned exactly on the table, that required a user positioned at the bottom of the table to reach clear across the table in order to deal with the image information. By changing the location of the coordinate system for the projection of the underlying image information, as discussed above, the user may drag the coordinate system toward him thus placing the image at a more comfortable location, namely at page 5,2 which is much closer. Although the example given has utilized integer page movements, page movements can be specified in fractions of a page.

Figure 14:
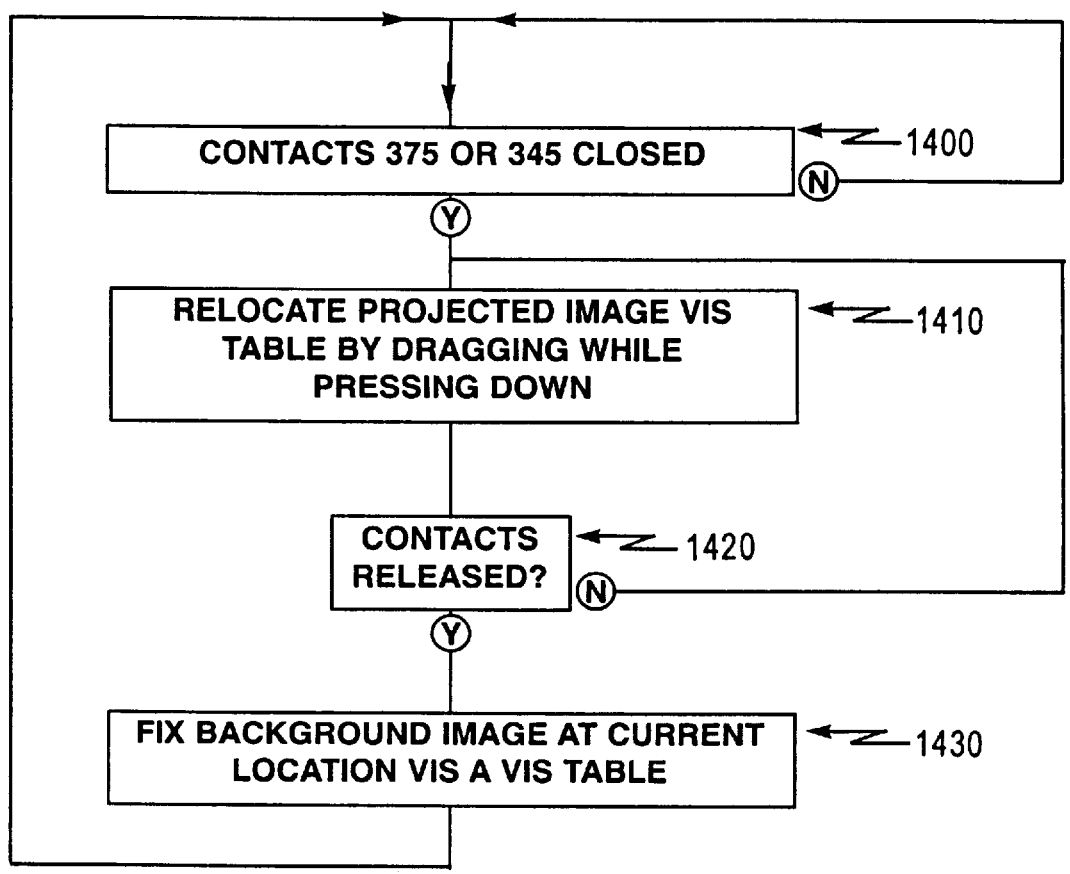
FIG. 14 is a flowchart of a process for moving the coordinate system of the background image with respect to a table.

FIG. 14 is a flowchart of a process for moving the coordinate system of the background image with respect to a table as discussed in conjunction with FIG. 13. When contacts 375 or 345 shown in FIGS. 3A and 3B are closed (1400), the projected image projected onto the table is relocated vis a vis the table by dragging the viewport display while either set of contacts is closed (1410). When the contacts are released (1420-Y), the projected background image stays at its current location vis a vis the table and the image displayed on the viewport resumes its normal function, changing as a position of the viewport display changes as it moves over the surface of the table (1430).

There has thus been disclosed a viewport display which interacts with a large low resolution display to provide additional capabilities for viewing information in ways which overcome the problems of the prior art. Additionally, the viewport display provides an independent way of changing information display for large documents even when no projector is utilized. In this manner, the problems of the prior art are overcome.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:
1. Apparatus for displaying information, comprising:
   a. a large surface;
   b. a substantially flat panel video display for displaying information from a computer;
   c. a location device for locating said display in three dimensions with respect to a point on said large surface and for changing said information as said display moves with respect to said point.
2. Apparatus of claim 1 in which information displayed is frozen when said location device indicates that said display has been lifted from said large surface.
3. Apparatus of claim 1 in which at least two substantially flat panel video displays are positioned on said surface, each connected to said computer and said computer is configured to transfer information from one of said displays to another.
4. Apparatus of claim 1 in which said large surface is a back lighted projection screen and the information displayed on said screen is used to determine the portion of information displayed on said substantially flat panel video display.
5. Apparatus of claim 1 in which the location of the information displayed on said screen changes when a user presses down on said display and drags the display over the surface.
6. Apparatus of claim 4 in which said projection screen displays an image using a scanning projector and said display detects its own location using a photocell which detects the passing of the projector's scanning.
7. A method for indexing information, comprising,
   a. placing a flat panel video display for displaying information from a computer on a flat surface;
   b. locating said display with respect to a point on said surface;
   c. using an image projected on said flat surface as an index into a source of information.
8. A system for displaying information, comprising:
   a. a large surface;
   b. a smaller substantially flat panel video display for displaying information from a computer; and
   c. a location device for locating said display in three dimensions with respect to a point on said large surface and for changing said information as said display moves with respect to said point.
9. A computer program product, comprising:
   a. a memory medium; and
   b. a computer program stored on said memory medium, said computer program comprising instructions for locating said display with respect to a point on a surface; and using an image projected on said surface as an index into at least one source of information.
10. Apparatus for displaying information, comprising:
    a. a large display surface;
    b. a substantially flat panel video display for displaying information;
    c. a location device for locating said video display with respect to a point on said large display surface and for changing said information as said video display moves with respect to said point, information on said video display being frozen when said location device indicates that said video display has been lifted from said large display surface.
11. Apparatus of claim 10, configured to extract information from said large display surface for display on said video display.

* * * * *